(12) United States Patent
Skipper et al.

(10) Patent No.: US 9,049,820 B2
(45) Date of Patent: Jun. 9, 2015

(54) ROTARY PLANT HEDGER

(71) Applicant: Skipper Grassing Inc., Fort Meade, FL (US)

(72) Inventors: Christopher Alan Skipper, Babson Park, DE (US); John William Kregl, Lake Wales, FL (US)

(73) Assignee: Skipper Grassing Inc., Fort Meade, FL (US)

( * ) Notice: Subject to any disclaimer, the term of this patent is extended or adjusted under 35 U.S.C. 154(b) by 202 days.

(21) Appl. No.: 13/833,536

(22) Filed: Mar. 15, 2013

(65) Prior Publication Data

US 2014/0260147 A1 Sep. 18, 2014

(51) Int. Cl.
*A01G 3/04* (2006.01)

(52) U.S. Cl.
CPC .......................................... *A01G 3/04* (2013.01)

(58) Field of Classification Search
CPC ... A01G 17/02; A01G 17/023; A01G 17/026; A01G 17/00; A01G 3/04; A01G 3/0408; A01G 3/0426; A01G 3/0435; A01G 2003/0443; A01D 34/863; A01D 34/866
USPC .......... 56/235, 234, 233, 236, 15.2, 255, 15.5
See application file for complete search history.

(56) References Cited

U.S. PATENT DOCUMENTS

| | | | |
|---|---|---|---|
| 53,033 A * | 3/1866 | Oliver | 56/235 |
| 2,798,354 A * | 7/1957 | O'Brien et al. | 56/235 |
| 2,926,480 A * | 3/1960 | Kimball | 56/235 |
| 3,138,911 A | 6/1964 | Pounds | |
| 3,246,460 A * | 4/1966 | Patterson et al. | 56/235 |
| 3,433,005 A * | 3/1969 | Olson et al. | 56/235 |
| 3,665,685 A * | 5/1972 | Allard | 56/10.4 |
| 3,685,264 A * | 8/1972 | Littau | 56/209 |
| 3,952,485 A | 4/1976 | McRobert | |
| 4,067,178 A | 1/1978 | Miller | |
| 4,206,585 A | 6/1980 | Pollock | |
| 4,302,922 A | 12/1981 | Guerndt, Jr. et al. | |
| 4,383,400 A | 5/1983 | Mead et al. | |
| 4,383,401 A | 5/1983 | Lessard et al. | |
| 4,543,775 A | 10/1985 | Horn et al. | |
| 5,259,177 A | 11/1993 | Windemuller et al. | |
| 5,291,723 A * | 3/1994 | Lindsey | 56/235 |
| 5,430,999 A | 7/1995 | Grant | |

(Continued)

FOREIGN PATENT DOCUMENTS

GB 2149635 6/1985

OTHER PUBLICATIONS

Chopzilla by Agriquip available at URL www.chop-zilla.com visited on Mar. 14, 2013.

*Primary Examiner* — Árpád Fábián-Kovács
(74) *Attorney, Agent, or Firm* — Fleit Gibbons Gutman Bongini & Bianco PL; Jon A. Gibbons (57) ABSTRACT

A commercial mechanical plant hedger is disclosed. This hedger is capable of trimming multiple cutting planes—top, left, and right simultaneously. Stated different three (3) sides of a row of a hedge can be trimmed at the same time. More specifically, the hedger can simultaneously cut the top of and both sides of the plant rows simultaneously. Hedging debris from the plant is also removed. The hedger is also capable of hedging multi rows from single drive middle up to 12 feet on centers. A small tractor with minimum horsepower is capable of running the hedger.

16 Claims, 11 Drawing Sheets

(56) References Cited

U.S. PATENT DOCUMENTS

| | | |
|---|---|---|
| 5,544,444 A | 8/1996 | Oldridge |
| 5,694,753 A * | 12/1997 | Dellinger ................ 56/234 |
| 5,718,106 A | 2/1998 | Waldron |
| 5,737,908 A * | 4/1998 | Andelfinger ............ 56/235 |
| 5,832,706 A | 11/1998 | Edwards |
| 6,250,056 B1 | 6/2001 | Spagnolo |
| 6,286,605 B1 * | 9/2001 | Landeis ................ 171/50 |
| 6,523,337 B2 | 2/2003 | Spagnolo |
| 6,634,162 B1 | 10/2003 | Andros |
| 6,698,176 B2 * | 3/2004 | Scott ................ 56/235 |
| 6,860,093 B2 * | 3/2005 | Scordilis ............ 56/15.2 |
| 6,959,528 B1 * | 11/2005 | Scordilis ............ 56/15.8 |
| 7,204,072 B2 | 4/2007 | Joy et al. |
| 7,644,564 B2 | 1/2010 | Pellenc |
| 7,870,712 B2 | 1/2011 | Pellenc |
| 8,112,978 B1 | 2/2012 | Dyal |
| 2002/0043061 A1 * | 4/2002 | Spagnolo ............ 56/229 |
| 2005/0000202 A1 | 1/2005 | Scordilis |
| 2005/0039431 A1 | 2/2005 | Schloesser et al. |
| 2006/0162309 A1 | 7/2006 | Schloesser |
| 2014/0000232 A1 * | 1/2014 | Andros et al. ........ 56/235 |

* cited by examiner

ROTARY PLANT HEDGER

BACKGROUND OF THE INVENTION

The present invention generally relates to a hedger/cutting unit and more particularly to a hedger cutting unit to cutting vegetation simultaneously along multiple sides or multiple planes.

Upon completion of fruit or vegetable harvesting, a grower only has a limited time to hedge his plants to start the new season's plant growth. Once the plant is hedged, the farmer will try and get has much new plant growth as possible. New plant growth on many plants is where the blooms grow. The more blooms, the more fruit. Growers face the challenges of weather, time, and labor to complete this task.

Conventional hedgers include a plurality of rotating cutting blades fixed to a stationary or rotating cutting blade arm. The cutting blade arm may be controllably attached to an industrial vehicle for numerous cutting operations, including topping, skirting and hedging.

The conventional devices, however, generally have a limited cutting area. Moreover, the conventional devices generally have a single blade supporting arm, limiting the configurations of the blades. Still further, conventional hedgers lack structure enabling cutting over obstacles and lack structure enabling multiple blade configurations and cutting multiple sides of vegetation.

SUMMARY OF THE INVENTION

A novel commercial mechanical plant hedger. This hedger is capable of trimming multiple cutting planes—top, left, and right simultaneously. Stated differently, three (3) sides of a row of a hedge can be trimmed at the same time. More specifically, the hedger can simultaneously cut the top of and both sides of the plant rows simultaneously. Hedging debris from the plant is also removed. The hedger is also capable of hedging multiple rows from a single tractor path up to 12 feet on centers. A small tractor with minimum horsepower is capable of running the hedger.

This hedger is capable of handling small as well as large farms. This hedger can be utilized on most small farm tractors equipped with a loader joystick and hydraulic remotes. The hedger can be used on either an enclosed cab or covered tractor allowing the user to hedge in all weather conditions and without safety issues.

In one example, a hedger apparatus for pruning a plant includes a frame to mechanically mount at least three cutting decks in a substantially inverted U orientation. The three-cutting decks are configured as a right cutting deck, disposed in a substantially vertical position for cutting the right side of the plant, a left cutting deck, disposed in a substantially vertical position for cutting the left side of the plant, and a top cutting deck, disposed in a substantially horizontal position for cutting the top of the plant. Each of the cutting decks includes a set of at least three rotatable circular blades for simultaneously shaping the right of the plant, the left of the plant, and the top of the plant when hedging the plant.

In another example, a hedger includes a horizontal boom with a first end attached to a rotatable vertical shaft. A linear actuator is coupled to the horizontal boom for rotating the boom from a first position to a second position, the first position and second position being separated by approximately 90 degrees. A frame is coupled to a second end of the horizontal boom to mechanically mount at least three cutting decks in a substantially inverted U orientation. The three cutting decks are attached as a right cutting deck, disposed in a substantially vertical plane for cutting the right side of a plant, a left cutting deck, disposed in a substantially vertical plane for cutting the left side of the plant, and a top cutting deck, disposed in a substantially horizontal plane for cutting the top of the plant. Each of the cutting decks includes a set of at least three rotatable circular blades for simultaneously shaping the plant along the right plane, the left plane and the horizontal plane of the plant, when passing therethrough.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including and/or having", as used herein, are defined as comprising (i.e., open language). The term "coupled", as used herein, is defined as connected, although not necessarily directly. The term "plant" or "hedge" is broadly used to mean any fruit or vegetable plant, especially a bush or tree that benefits from pruning, such as, but not limited to, a blueberry bush.

Disclosed is a hedger that is capable of hedging and removing hedging debris from the blueberry plant. The hedger can cut both the top of and both sides of the plant rows simultaneously. The hedger is also capable of hedging multiple rows from a single tractor path up to 12 feet from the centers. Brief testing shows that the hedger will be able to run on a small farm tractor with minimum horse power (lowest HP unknown) and can be removed from the tractor and stored in the off season. This will allow the farmer other uses for his tractor.

The present application is a commercial blueberry mechanical hedger. This hedger is capable of trimming three (3) sides of a row of blueberry bushes at the same time. More specifically, the hedger can simultaneously cut the top of and both sides of the plant rows. Hedging debris from the blueberry plant is also removed. The hedger is also capable of hedging multiple rows from a tractor path up to 12 feet from the center. A small tractor with minimum horsepower is capable of running the hedger.

Overview of Hedger Mechanism

Figure 1:
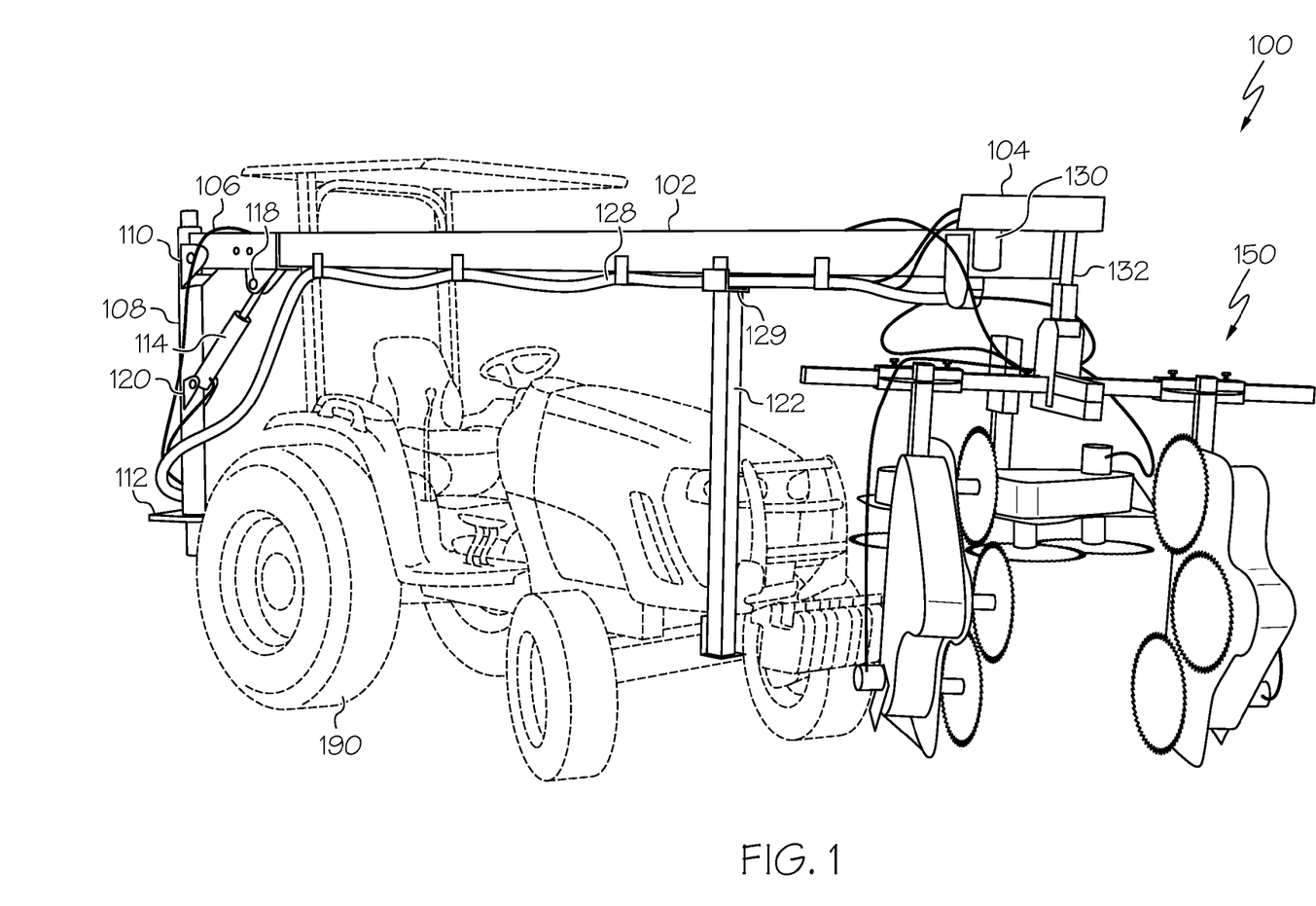
FIG. 1 is a front perspective view of a hedger in a resting position with a tractor.

Turning now to FIG. 1, shown is a front perspective view of a hedger mechanism 100 in a resting position on a tractor 190. The hedger is mechanically coupled and hydraulically coupled to the tractor 100 as is described in more detail below. A three deck cutting head 150 is mechanically coupled by a vertical support bar 132 to a rotating head motor 130. A rotating head motor safety cover 104 is also shown. This rotating head motor safety cover 104 protects internal components, such as gears, pulleys, belts, and other drive components mechanically coupled to the rotating head motor 130.

Figure 2:
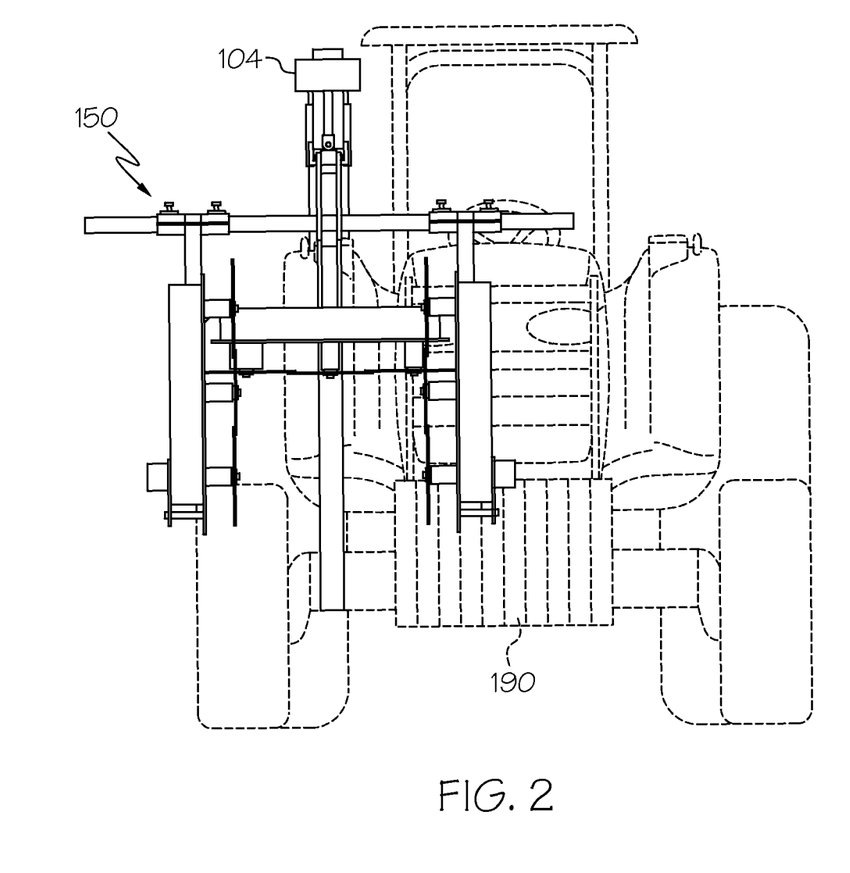
FIG. 2 is a front view of the hedger in the resting position with the tractor.
Figure 3:
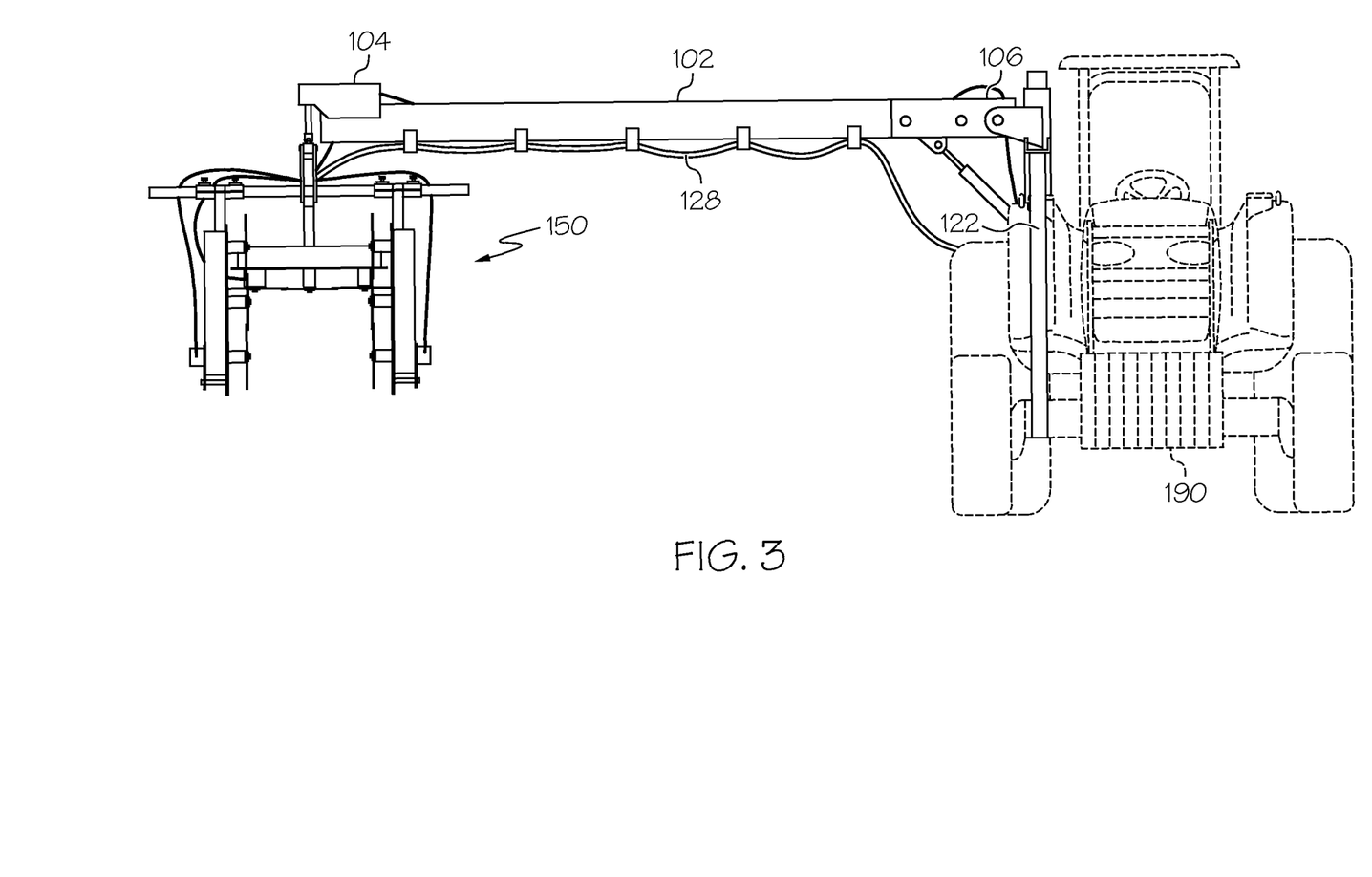
FIG. 3 is front view of the hedger in an extended position with the tractor.

FIG. 2 provides a front view of the hedger in the resting position with the tractor. The purpose of the rotating head motor 130 is to turn the cutting head 150, typically 90 degrees clockwise or counterclockwise when viewed from the top, when the hedger 100 is in an extended position as shown in FIG. 3. A set of hydraulic hoses 128 is firmly attached to a horizontal boom 102 for powering rotatable actuators or motors in the cutting head 150 is shown. To provide an approximate geometry, the horizontal boom 102 is approximately 13 feet in length, and it is important to note that other longer and shorter booms are contemplated within the true scope of the present application. The horizontal boom 102 in one example is fabricated from aluminum to keep the weight light. Other components may be made out of aluminum, steel, iron, composites, or a combination thereof. For simplicity, although other hydraulic lines shown in black are mainly used for positioning control, they are not labeled to reduce clutter and will be discussed in greater detail with reference to the hydraulic schematics in FIG. 10 and FIG. 11 below.

Returning to FIG. 1, the horizontal boom 102 is shown resting on vertical rest 122 with saddle 129. The purpose of the rest is to keep the horizontal boom 102 from moving when the tractor is being repositioned or transported. A boom lift sleeve 106 is mechanically attached to the horizontal boom 102 with a series of fasteners, such as bolts, screws, welds, pins, or a combination thereof. The boom lift sleeve 106 includes an upper cylinder bracket 118 for pivotally attaching to one end of a lifting vertical actuator such as lift cylinder 114. The other end of the lift cylinder 114 is pivotally attached to a vertical shaft 108 by a lower cylinder bracket 120. The lift cylinder 114 enables an end of the horizontal boom 102 mechanically coupled to cutting head 150 to change vertical elevation and be lifted off the vertical rest 122. Also, the horizontal boom 102 is pivotally coupled to a rear boom saddle mount 110 that is coupled to the vertical shaft 108 as shown. The vertical shaft 108 is pivotally mounted to a rotating arm 112 which is attached to the tractor 190. The combination of the horizontal boom 102, the lifting cylinder 114, the vertical shaft 108, the boom rotating arm 112, a swing cylinder 914 (shown in FIG. 9) and the rotating head motor 130 working together in mechanical cooperation enables the cutting head 150 to be extended out from the right side of the tractor 190 as shown in FIG. 3. It is important to note that in another example the horizontal boom 102 can also be positioned on the left side of the tractor to permit hedging operations on the left side as well. This is important to enable the hedger mechanism 100 to be used down on a single tractor path to trim on each side of the tractor 190.

Cutting Head 150

Figure 4:
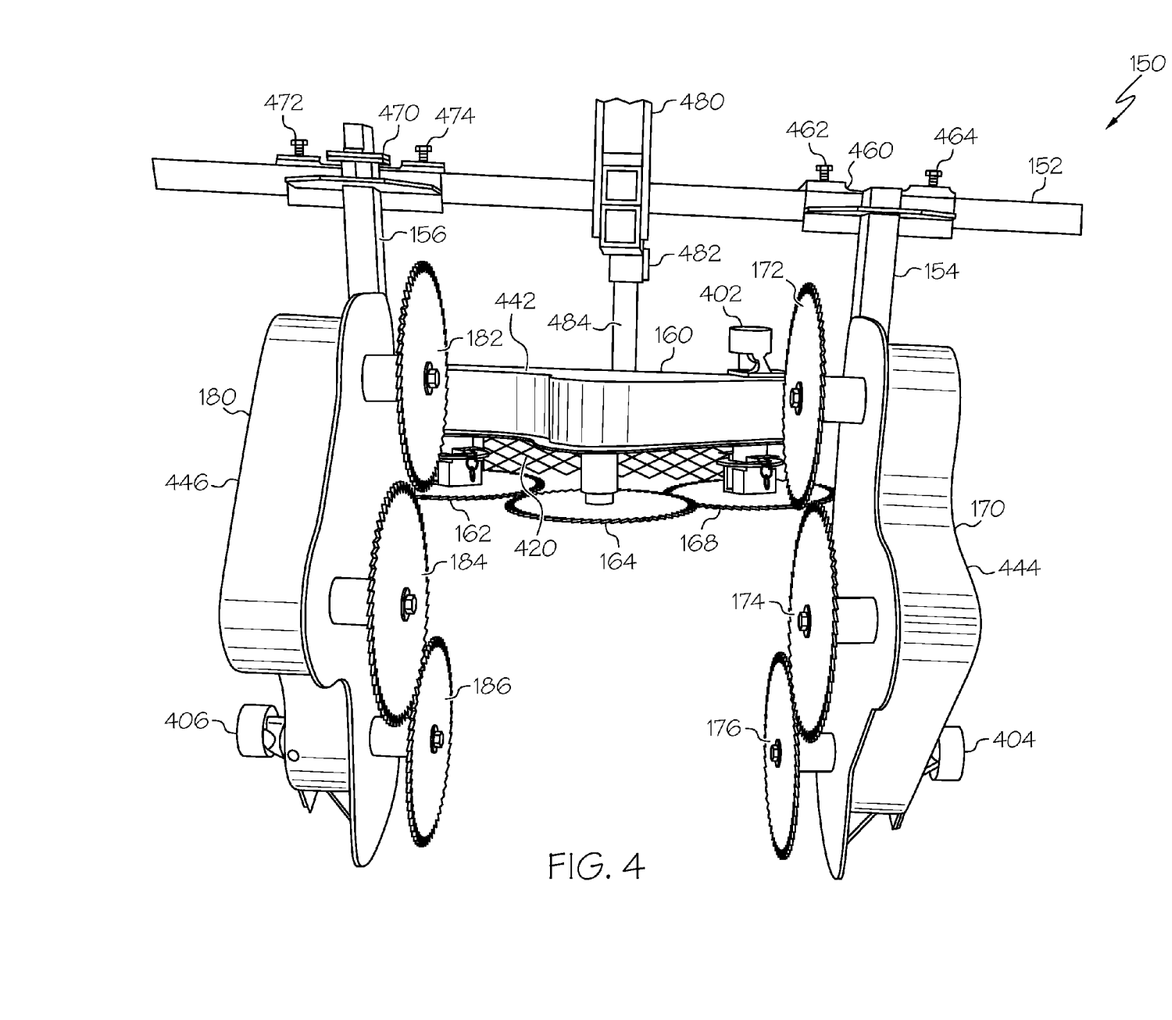
FIG. 4 is a detailed front view of the cutting head.

FIG. 4 is a detail front view of cutting head 150. Shown are a top cutting deck 160, a right cutting deck 170, and a left cutting deck 180. The cutting head 150 is pivotally attached to the horizontal boom 102 with a universal joint or gimbal 480 in order to automatically level the cutting head with respect to the ground. Each of three cutting decks 160, 170, and 180 includes three rotatable circular blades. The rotatable circular blades typically rotate in the same clock-wise or counter-clockwise direction. To provide an approximate geometry, each of the cutting decks 160, 170, 180 is approximately 37" along its longest side, but other sides and geometries are possible. Specifically, the top cutting deck 160 includes three rotating blades 162, 164, and 168. The right cutting deck 170 includes three rotating blades 172, 174, and 176. Likewise, the left cutting deck 180 includes three rotating blades 182, 184, 186. To provide an example of geometry and size, each blade is approximately 14 inches but other sizes are also available. The blades are hedging blades to enable cutting in the plane of the blade as well as angles above and below the plane of the blade. In one example, the blades have 62 teeth to enable a smooth cut. Each of three cutting decks 160, 170, and 180 includes at least one hydraulic motor 402, 404, 406 coupled to hydraulic lines 128. The internal drive mechanism of these cutting heads 160, 170, and 180 are described below with reference to FIG. 5. Each of the three cutting decks 160, 170, and 180 includes a safety cover 442, 444, 446 to keep various drive components, e.g. pulleys, tensioners, belts, motor drives, protected.

The position of each of these three cutting decks 160, 170, 180 is adjustable. The height of the top deck 160 may be positioned up or down in the field by collar 482 and top deck support 484. In one example the top cutting deck 160 is slidably adjustable in a range from approximately 26 inches to 120 inches; however, other distances and geometries are possible within the true scope of the present application. The left cutting deck 170 is adjustable along horizontal support arm 152 by slidably adjusting the relative position of the collar 460 by loosening the two fasteners 462 and 464. The collar 460 is coupled with a support 154 which holds the left cutting deck 170. Likewise, the right cutting deck 180 is adjustable along horizontal support arm 152 by slidably adjusting the relative position of the collar 470 by loosening the two fasteners 472 and 474. The collar 470 is coupled with a support 156 which holds the right cutting deck 180. By slidably cooperatively positioning the left cutting deck 170 and the right cutting deck 180 along the support arm 152, the distance can be adjusted from approximately 6 inches to 40 inches on blade center; however, other distances and geometries are possible within the true scope of the present application.

Also shown in FIG. 4 is a safety guard 420 to keep plant debris from being thrown towards the operator of the tractor 190 by the high speed rotation of debris sweepers 666, 666, 676, 684, 686 during a cutting or hedging operation. It is important to note that other covers and guards may also be added or removed as needed.

The exact positions of each rotating blade 162, 164, 164 in top cutting deck 160 or in the left-side 170 or the right side 180 cutting decks can be altered so that the blades are cutting on the same plane or slightly offset to be on parallel planes to each other.

Cutting Deck Drive Components

Figure 5:
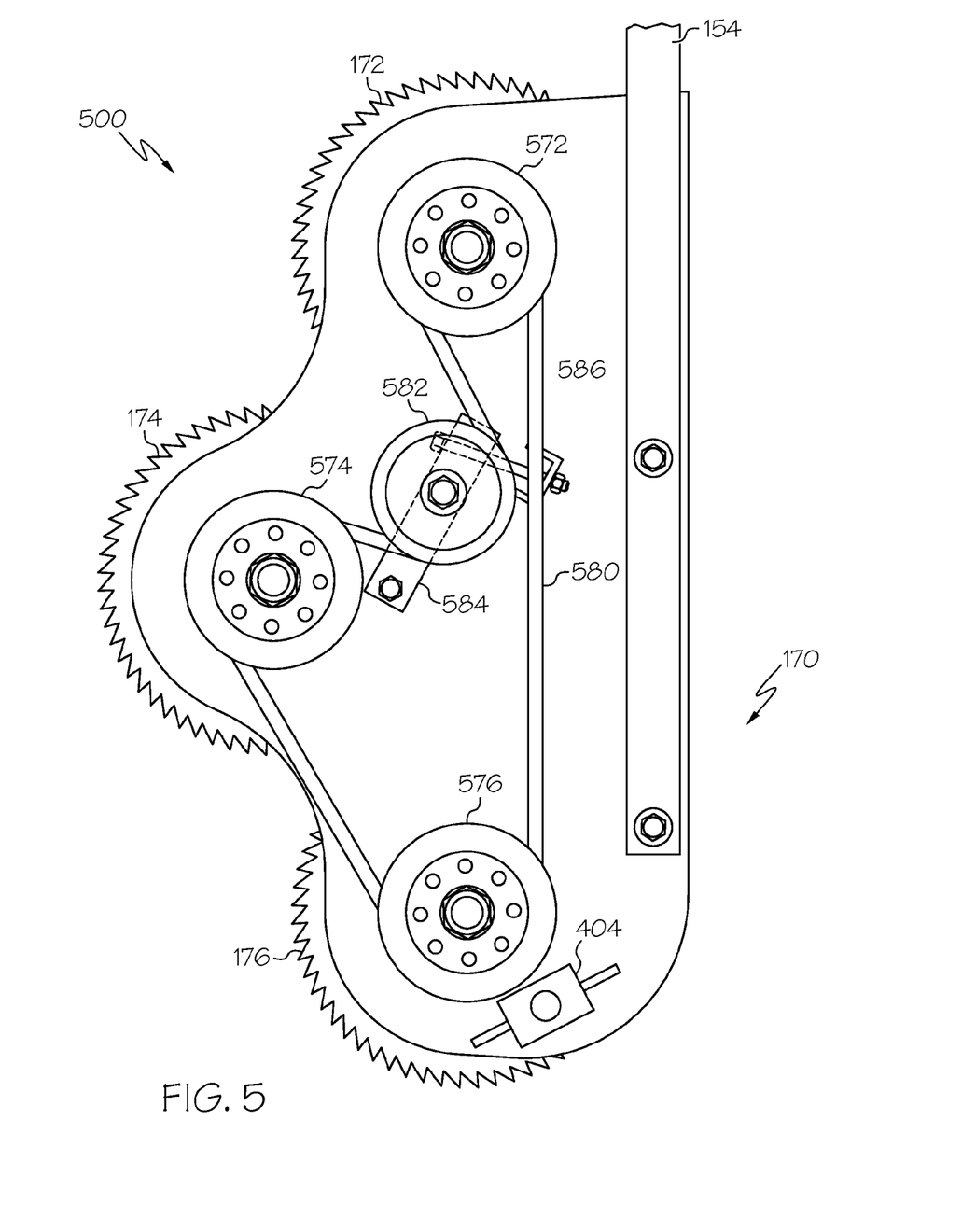
FIG. 5 is a detailed left-side view of one of the left hedger cutting decks of FIG. 4 with a side safety cover removed to show the mechanical drive components.

FIG. 5 is a detailed left-side view of one of the left hedger cutting decks of FIG. 4 with a side drive cover 444 removed to show the mechanical drive components 500 of the cutting blades 172, 174, and 176. A drive pulley 576 is mechanically coupled to hydraulic drive motor 404 on one side and a cutting blade 176 on the other side. The mechanical coupling of the hydraulic drive motor 404 can be through a chain, a belt, gears, direct drive or a combination thereof. The drive pulley 576 moves a drive belt 580 to turn blade pulley 572 and blade pulley 576. In this example, each of the pulleys 572, 574, and 576 are turning in a counter-clockwise direction when coupled to the blades 172, 174, and 176 respectively. A tensioner pulley 582 for adjusting the tension on pulley mount 584 using adjusting mechanism 586 on the drive belt 580 is also shown.

Debris Sweeper

Figure 6:
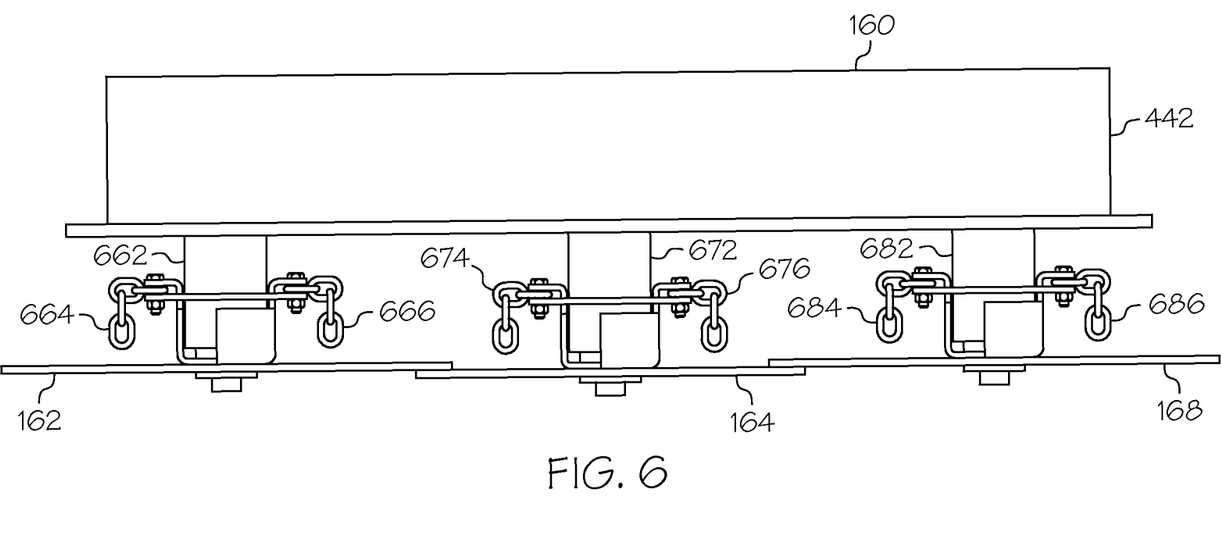
FIG. 6 is a detailed front view of the debris sweeper on the top cutting deck of FIG. 4.
Figure 7:
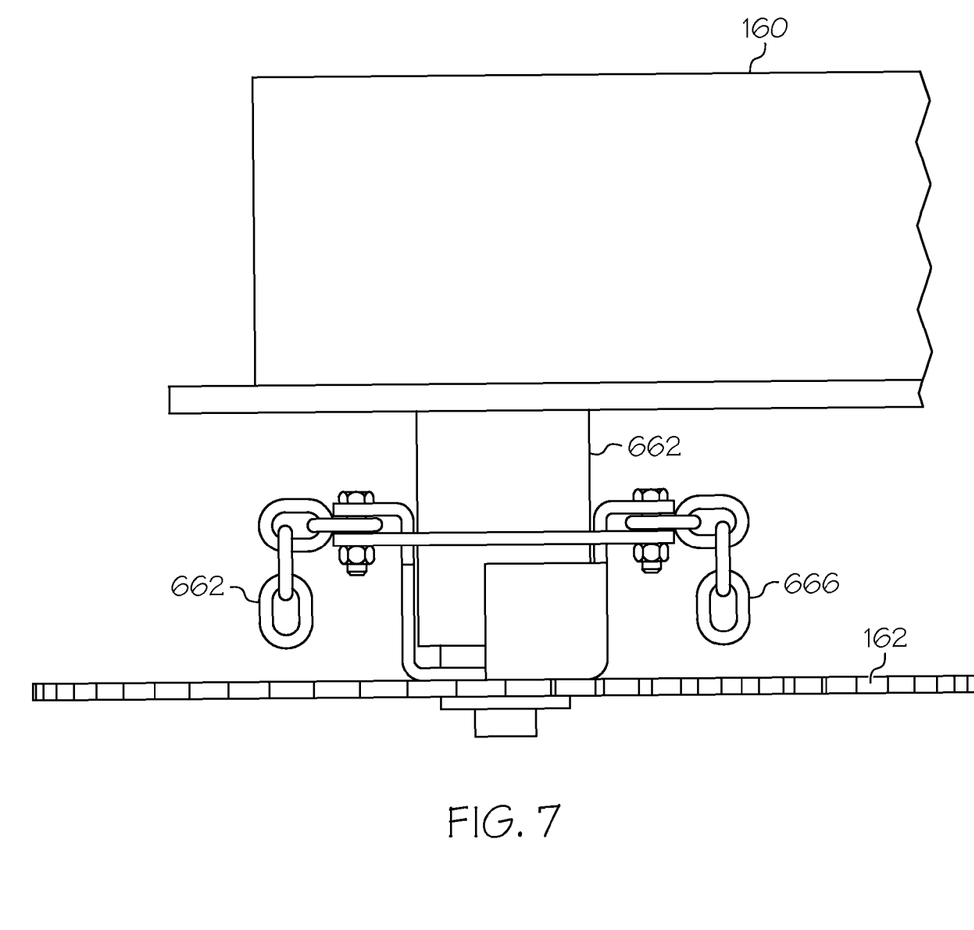
FIG. 7 is a single debris sweeper attached to the right-most cutting blades from the three cutting blades of the top cutting deck of FIG. 4.
Figure 8:
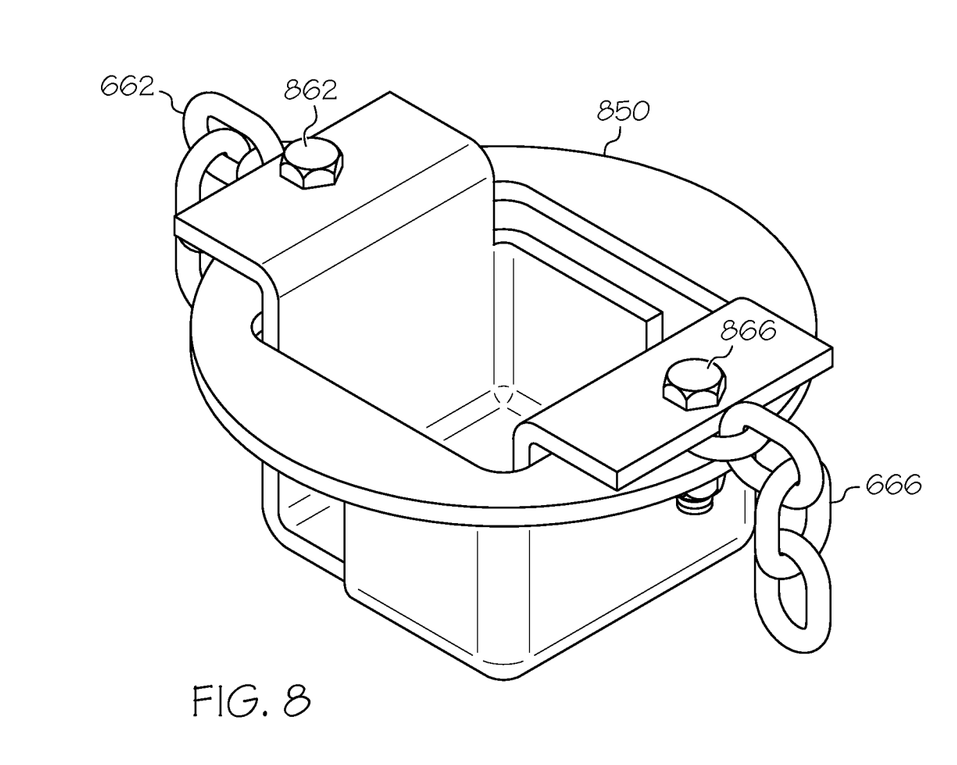
FIG. 8 illustrates further details of debris sweeper of FIG. 7.

FIG. 6 is a detailed front view of the debris sweepers 664, 666, 674, 676, 684, 686 on the top cutting deck 160 of FIG. 4. Each of the three cutting blades 162, 164, 168 is attached to shaft 662, 674, 682 respectively which are driven by mechanism drive components under cover 442 similar to those described in FIG. 5. In this example each of the debris sweepers 664, 666, 674, 676, 684, 686 is a chain that will rotate with the blades to keep cut vegetation clear from areas near shafts 662, 674, 682. The detail of debris sweepers 662 and 666 is shown in FIG. 7. Moreover, the debris sweeper sleeve 850 is shown in FIG. 8. Also shown are two fasteners 862 and 866 for securely fastening the debris sweeper 662 and 666 to sleeve 850. The sleeve 850 couples with and rotates with shaft 662.

Hydraulic Connections

Figure 9:
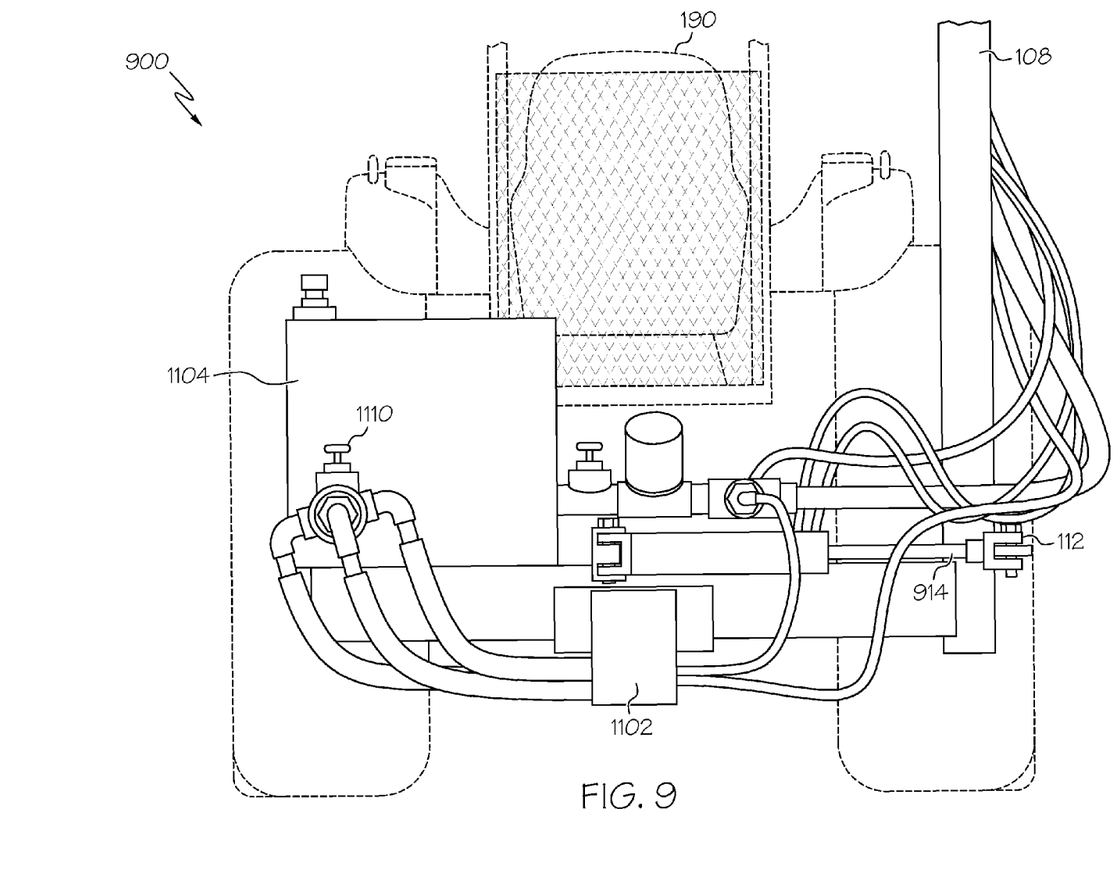
FIG. 9 is rear view of the hedger with the tractor.

FIG. 9 is rear view 900 of the hedger mechanism with the tractor 190. It is important to note that in this example there are two separate and distinct hydraulic systems. The first hydraulic system has a hydraulic pump 1102 coupled to the power take-off drive from tractor 190. The first hydraulic system is used to drive the three hydraulic motors 402, 404, 406 that turn the rotating blades 162, 164, 168, 172, 174, 176, 182, 184, 186 in the cutting heads 150. Powering the rotating blades 162, 164, 168, 172, 174, 176, 182, 184, 186 separately, keeps the hydraulic system of the tractor 190 from being over-burdened.

A second hydraulic system is hydraulically coupled to the tractor's hydraulic system. Stated differently, unlike the first hydraulic system that is powered by the tractor's power take-off, the second hydraulic system is powered by the tractor's own hydraulic pump. The second hydraulic system is used for positioning, more specifically to provide the lift and swing of the tractor's boom 102 and cutting head 150.

Hydraulic Schematics

Figure 10:
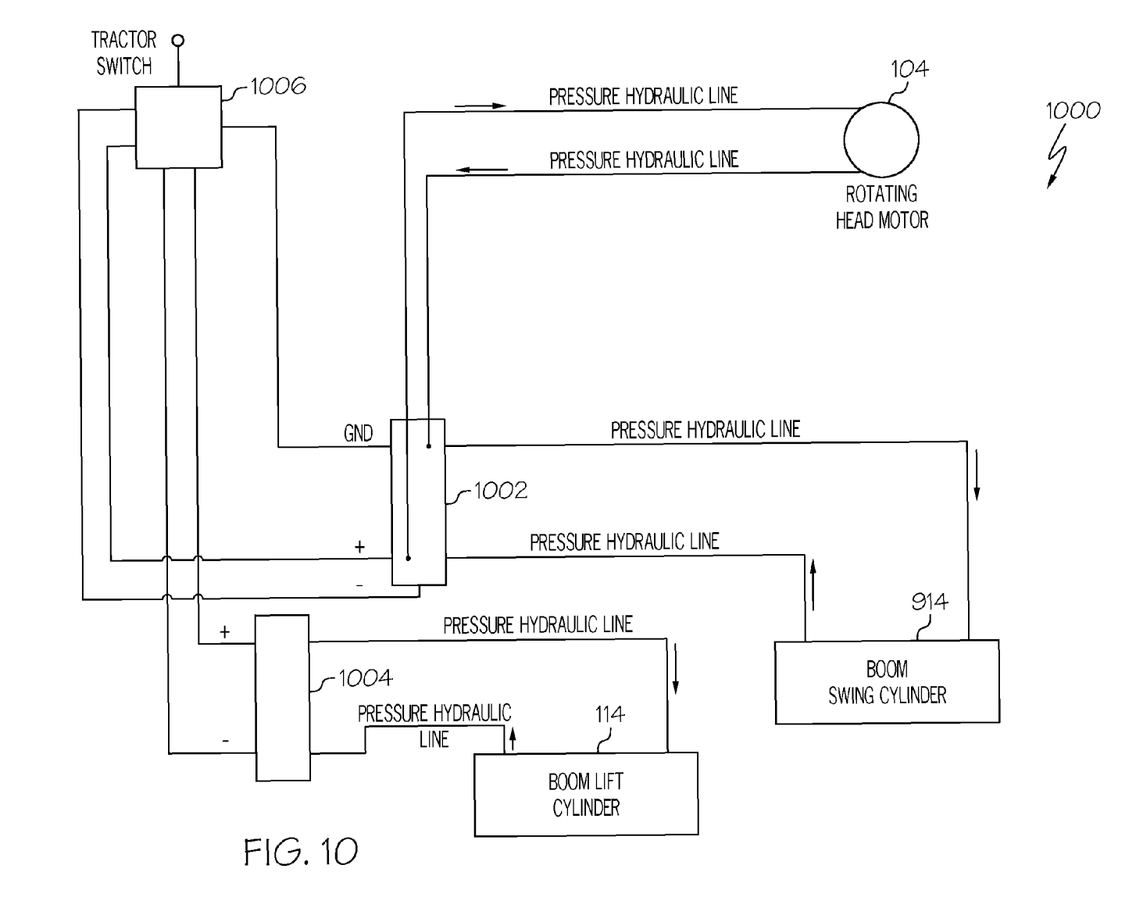
FIG. 10 is schematic view of the hydraulic components of the hedger using the tractor controls.

FIG. 10 is schematic view of the hydraulic positioning control components 1000 of the hedger. The tractor hydraulic control switch 1006 is part of the tractor 190. This is typically a multi-pole 12 volt switch with ground. The other items are part of the hedger mechanism 100. Specifically, tractor hydraulic switching value solenoid 1 1002, tractor hydraulic switching value solenoid 2 (4-way diverter valve) 1004, and tractor hydraulic control valve (4-way diverter valve) 1006 which all form hydraulic interfaces in fluid communication with the rotating head motor 130, the lift cylinder 114, and the swing cylinder 914. Accordingly it can be understood that positioning including cylinders 114, swing cylinder 914, and rotating head motor 130 are coupled to the tractor's hydraulic system. The hydraulic positioning control components 1000 provide the lifting, swinging and positioning of the tractor's boom 102 and cutting head 150.

Figure 11:
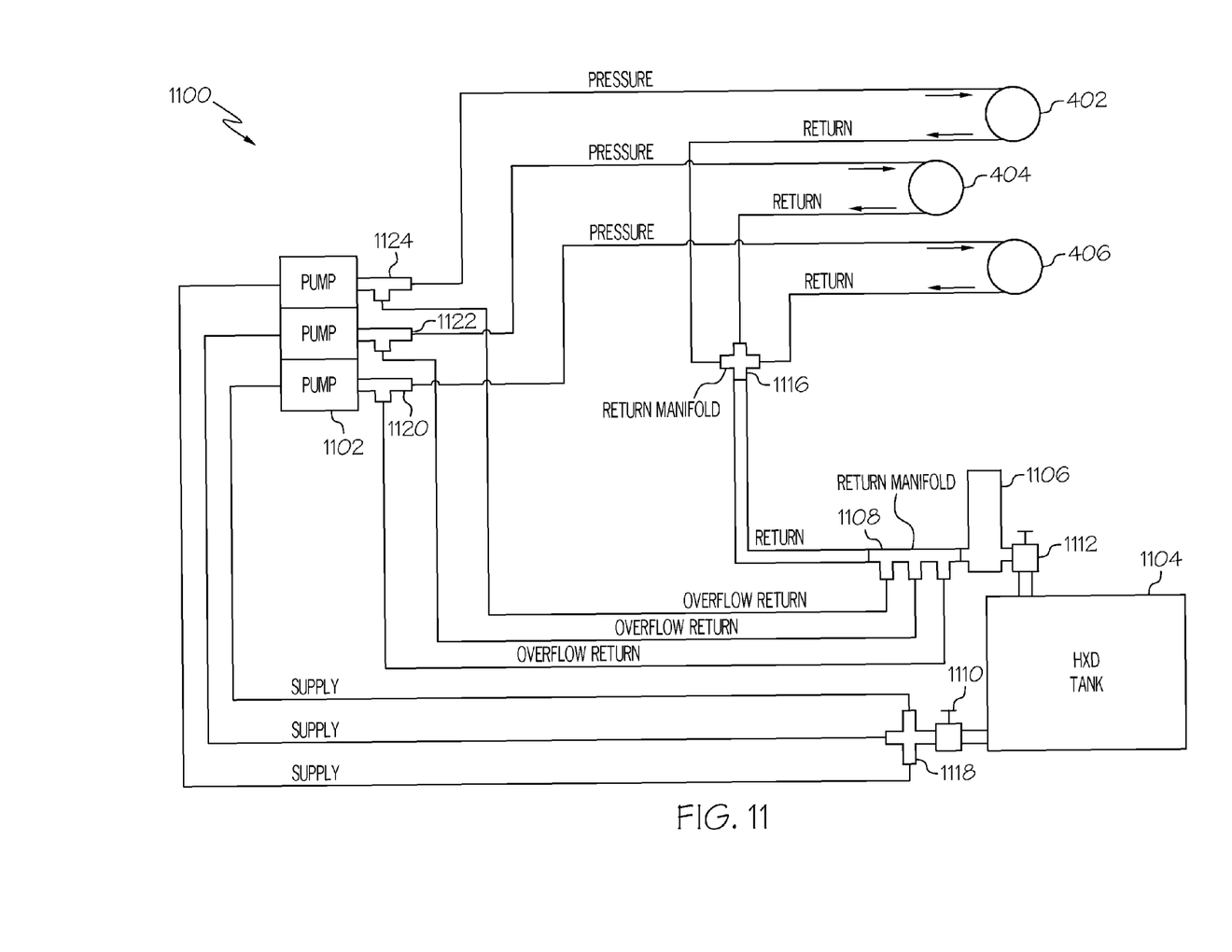
FIG. 11 is schematic view of the hydraulic components of the hedger with a separate pump and reservoir.

FIG. 11 is schematic view 1100 of the hydraulic components of the hedger system 100 with a separate pump and reservoir. The pump 1102 is mechanically coupled to the power take off of tractor 190. In one example, the pump 1102 is actually three separate stages with each stage including a separate output to each of the three cutting decks i.e. top cutting deck 160, left cutting deck 170, and right cutting deck 180. This allows the rotating blades 162, 164, 168 of the top cutting deck to be independent from the rotating blades 172, 174, 178 of the left cutting deck 170 and rotating blades 182, 184, 188 of the right cutting deck 180. For example, the tractor 190 can have an idle of approximately 1100 RPM turning the three-stage pump 192 in order to circulate about 10 gal/min of hydraulic to each of the three cutting decks motors 402, 404, and 406. The purpose of manifolds 1120, 1122, 1124 along with pressure regulated tank manifold 1108 is to allow a return overflow return in case any of the rotating blades on any of the three cutting decks 160, 170, 180 are stalled or stuck.

A return manifold 1116 collects the return hydraulic fluid from the hydraulic motors 402, 404, 406 to direct it through the pressure regulated tank manifold 1118 through inlet vale 1112 to tank 1104. Hydraulic fluid exits the hydraulic fluid tank 1104 through outlet valve 1110 through manifold 1118 to each of the three pumps or stages of the pump 1102.

Non-Limiting Examples

Although the present application has been described in relative terms of size and shape of the components, other components of different sizes and shapes are within the true scope. Moreover, hydraulic actuators and hydraulic motors have been described. However, other rotatable and linear actuators/motive means that make use of air, electric motors, and combinations thereof are also contemplated. Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A hedger apparatus for pruning a plant, the apparatus comprising:
   a frame with a horizontal support arm to mechanically mount at least three cutting decks in a substantially inverted U orientation, including
      a right cutting deck with a right collar slidably attached to the horizontal support arm, disposed in a substantially vertical position for cutting a right side of the plant,
      a left cutting deck with a left collar slidably attached to the horizontal support arm, disposed in a substantially vertical position for cutting a left-side of the plant, and
      a top cutting deck, disposed in a substantially horizontal position for cutting a top-side of the plant,
   each of the cutting decks including at least a set of three rotatable circular blades for simultaneously shaping a rightside of the plant, a leftside of the plant, and a the topside of the plant when passing therethrough; and
   a substantially horizontal boom assembly with a first end to mount to a tractor and a second end mechanically coupled to the frame in order to rotate the second end of the horizontal boom assembly from a series of positions starting at position parallel to a direction of travel of the tractor to a position perpendicular to the direction of travel of the tractor.

2. The hedger apparatus of claim 1, wherein each of the three rotatable circular blades within one of the cutting decks, rotates in a same direction of rotation.

3. The hedger apparatus of claim 1, wherein
each of the three rotatable blades within the right cutting deck rotate clockwise and
each of the three rotatable blades within the left cutting deck rotates counter-clockwise.

4. The hedger apparatus of claim 1, further comprising:
at least one hydraulic pump; and
at least one hydraulic rotatable actuator mechanically coupled to the rotatable blades within the cutting decks.

5. The hedger apparatus of claim 1, wherein the top cutting deck, further includes at least one chain with a first end coupled to a shaft of one of the three rotatable circular blades and a second end not attached so that when the shaft rotates, the chain swings within an opening formed above the blade and around the shaft to remove hedging debris therefrom.

6. The hedger apparatus of claim 1, wherein at least the top cutting deck is adjustably mounted to the frame to create a configurable an adjustable height opening to hedge plants to different heights.

7. The hedger apparatus of claim 1, wherein the top cutting deck includes a top collar slidably attached to the horizontal support arm to create a configurable size opening to hedge plants to different widths and heights.

8. The hedger apparatus of claim 1, further comprising:
at least one hydraulic pump; and
a single right hydraulic motor in fluid communication with the hydraulic pump, the single right hydraulic motor coupled to a right cutting deck drive pulley with a belt forming a belt drive transmission system on the right cutting deck to rotate the set of three rotatable blades simultaneously;
a single left hydraulic motor in fluid communication with the hydraulic pump, the single left hydraulic motor coupled to a left cutting deck drive pulley with a belt forming a belt drive transmission system on the left cutting deck to rotate the set of three rotatable blades simultaneously
a single top hydraulic motor in fluid communication with the hydraulic pump, the single top hydraulic motor coupled to a top cutting deck drive pulley with a belt forming a belt drive transmission system on the top cutting deck to rotate the set of three rotatable blades simultaneously.

9. A hedger comprising
a horizontal boom with a first end attached to a rotatable vertical shaft;
a swing cylinder coupled to the horizontal boom for rotating the boom a first position to a second position, the first position and second position being separated by approximately 90 degrees;
a frame with a horizontal support arm, coupled to a second end of the horizontal boom to mechanically mount at least three cutting decks in an substantially inverted U orientation, including a right cutting deck with a right slidable collar attached to the horizontal support arm, disposed in a substantially vertical plane for cutting a right side of a plant,
a left cutting deck with a left slidable collar attached to the horizontal support arm, disposed in a substantially vertical plane for cutting a left of the plant, and
a top cutting deck, disposed in a substantially horizontal plane for cutting a top of the plant,
each of the cutting decks including at least a set of three rotatable circular blades for simultaneously shaping the plant along a right vertical plane, a left vertical plane and a top horizontal plane.

10. The hedger of claim 9, further comprising:
a rotatable actuator mechanically coupling the second end of the horizontal boom and the frame and for turning the frame relative to the horizontal boom.

11. The hedger of claim 10, further comprising:
a gimbal mechanically coupled to the rotatable actuator for holding the frame substantially parallel with the ground.

12. The hedger of claim 10, further comprising:
a lifting actuator to lift the second end of the horizontal boom between a first vertical elevation and a second vertical elevation.

13. The hedger of claim 12, further comprising:
a tractor hydraulic interface for receiving hydraulic control therefrom for the swing cylinder, the lifting actuator and the rotating actuator to position the horizontal boom from a first position to a second position.

14. The hedger of claim 10, further comprising:
at least one hydraulic pump; and
at least one hydraulic rotatable actuator in fluid communication with the hydraulic pump to mechanically coupled to the rotatable blades within the cutting decks.

15. The hedger apparatus of claim 9, wherein the top cutting deck includes a top collar slidably attached to the horizontal support arm to create a configurable size opening to hedge plants to different widths and heights.

16. The hedger of claim 9, further comprising:
at least one hydraulic pump; and
a single right hydraulic motor in fluid communication with the hydraulic pump, the single right hydraulic motor coupled to a right cutting deck drive pulley with a belt forming a belt drive transmission system on the right cutting deck to rotate the set of three rotatable blades simultaneously;
a single left hydraulic motor in fluid communication with the hydraulic pump, the single left hydraulic motor coupled to a left cutting deck drive pulley with a belt forming a belt drive transmission system on the left cutting deck to rotate the set of three rotatable blades simultaneously
a single top hydraulic motor in fluid communication with the hydraulic pump, the single top hydraulic motor coupled to a top cutting deck drive pulley with a belt forming a belt drive transmission system on the top cutting deck to rotate the set of three rotatable blades simultaneously.

* * * * *

UNITED STATES PATENT AND TRADEMARK OFFICE
CERTIFICATE OF CORRECTION

Page 1 of 1

PATENT NO.         : 9,049,820 B2
APPLICATION NO.    : 13/833536
DATED              : June 9, 2015
INVENTOR(S)        : Skipper et al.

It is certified that error appears in the above-identified patent and that said Letters Patent is hereby corrected as shown below:

On the title page item [72], "Inventors", the inventor's state of residence "DE" should read --FL--

In the claims

Column 6, lines 64-65, claim 1, the phrase "a the topside" should read --a topside--

Signed and Sealed this
Fifth Day of April, 2016

Michelle K. Lee
*Director of the United States Patent and Trademark Office*